United States Patent [19]

Burgess

[11] Patent Number: 5,000,591
[45] Date of Patent: Mar. 19, 1991

[54] DOCUMENT HANDLING APPARATUS

[75] Inventor: Ian Burgess, Sale, England

[73] Assignee: Halo Retail Systems Limited, Altrincham, England

[21] Appl. No.: 248,090

[22] Filed: Sep. 23, 1988

[30] Foreign Application Priority Data

Sep. 25, 1987 [GB] United Kingdom ............... 8722622

[51] Int. Cl.⁵ .................................. B41J 11/20
[52] U.S. Cl. .............................. 400/56; 400/58;
400/649; 400/73; 101/76; 101/91
[58] Field of Search .............. 400/649, 58, 59.56,
400/73; 355/64; 101/65, 76, 91, 236

[56] References Cited

U.S. PATENT DOCUMENTS

| | | | |
|---|---|---|---|
| 254,962 | 6/1963 | Facius et al. | |
| 430,842 | 5/1970 | Hawxhurst | |
| 1,243,802 | 10/1917 | Boswell | 101/236 |
| 1,850,922 | 3/1932 | Chisholm | 101/65 |
| 2,186,844 | 8/1937 | Burgess | |
| 3,033,108 | 5/1962 | Matthews | 101/91 |
| 3,077,832 | 2/1963 | Ritzerfeld et al. | 101/91 |
| 3,138,093 | 6/1964 | Rodgers | 101/91 |
| 3,142,246 | 7/1964 | Ross | 101/76 |
| 3,170,391 | 2/1965 | Ritzerfeld et al. | 101/91 |
| 3,217,639 | 11/1965 | Kelly | 101/91 |
| 4,002,117 | 1/1977 | Ritzerfeld | 101/91 |
| 4,283,621 | 8/1981 | Pembroke | 355/64 |
| 4,575,267 | 3/1986 | Brull | 400/58 |
| 4,577,956 | 3/1986 | Klosterhuber et al. | 355/64 |
| 4,632,577 | 12/1986 | Brull et al. | |
| 4,655,625 | 4/1987 | Brull et al. | 400/58 |
| 4,731,639 | 3/1988 | Gutmann et al. | 355/64 |
| 4,746,233 | 5/1988 | Garcia de Osuna et al. | 400/73 |
| 4,746,234 | 5/1988 | Harry | 101/91 |
| 4,780,007 | 10/1988 | Weeks et al. | 400/58 |
| 4,819,034 | 4/1989 | Weinzierl et al. | 355/64 |

FOREIGN PATENT DOCUMENTS

| | | | |
|---|---|---|---|
| 195981 | 10/1986 | European Pat. Off. | 400/58 |
| 109774 | 8/1981 | Japan | 400/58 |
| 203072 | 11/1983 | Japan | 400/58 |
| 191165 | 8/1987 | Japan | 400/58 |

Primary Examiner—Eugene H. Eickholt
Attorney, Agent, or Firm—Dennison, Meserole, Pollack & Scheiner

[57] ABSTRACT

Document handling apparatus 10 includes a reception platen 32 disposed below and movable with respect to a dot-matrix printer 28 having a printer head 30. A document placed on the platen 32 can therefore be brought into register with the printer head 30 by the raising and/or lowering of the platen 32 which is caused by a solenoid 48 linked to an eccentric cam 40 disposed below the platen 32. Rubber stoppers 38, 39 act as spacing means to ensure that a document in contact with the platen 32 and the stoppers 38 is at a distance from the printing head 30 pre-determined to allow the head 30 during its operation to contact the document's surface. Rollers 52 cause the document to be moved over the platen 32 and a sensor is provided to sense the presence of the document and actuate the solenoid.

4 Claims, 5 Drawing Sheets

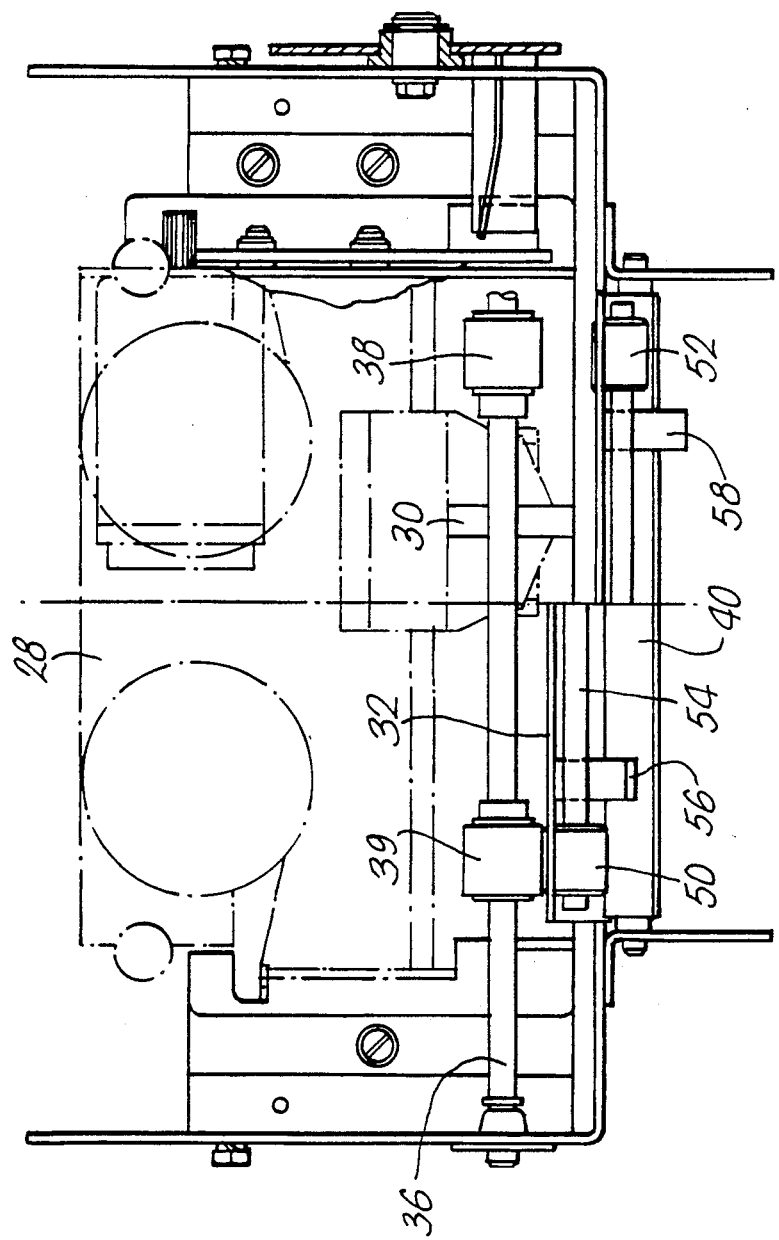

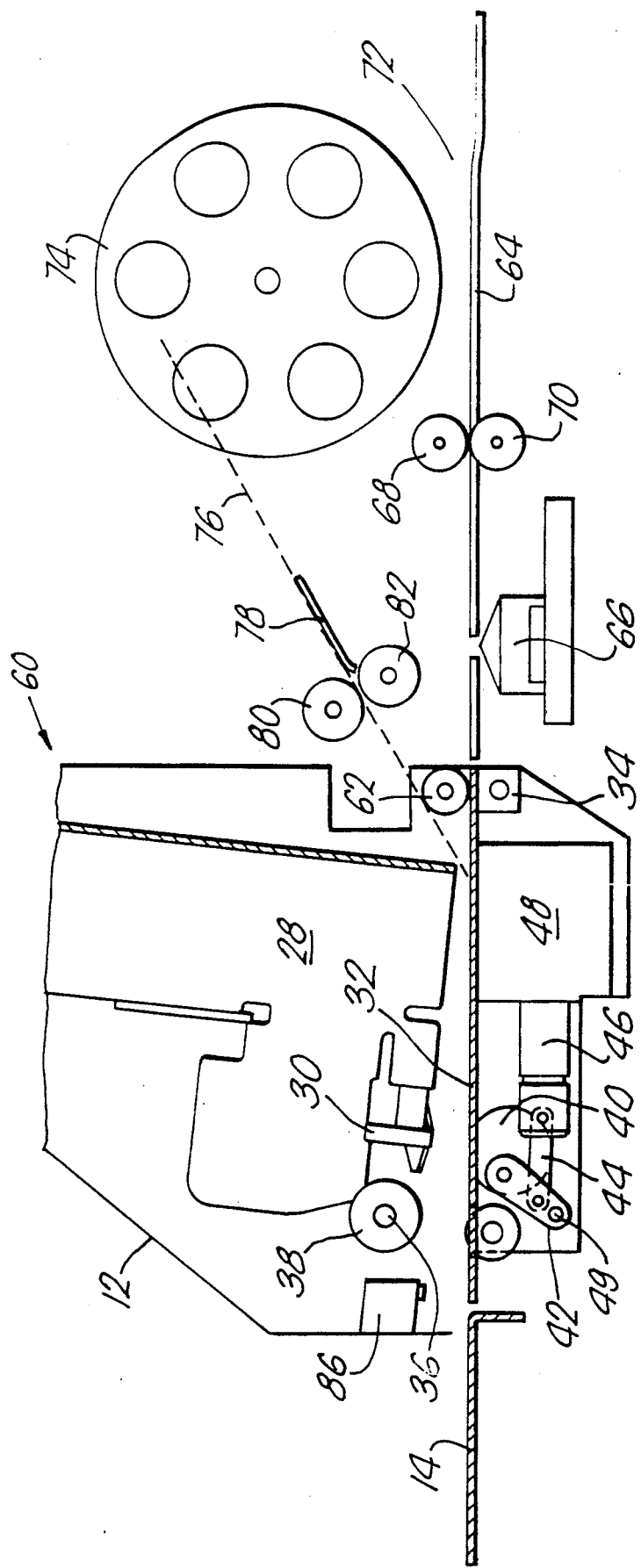

DOCUMENT HANDLING APPARATUS

This invention concerns document handling apparatus particularly such apparatus including a dot matrix printer for recording information on paper forms or slips which for any given form or slip comprises one or more sheets of paper.

Conventional document handling apparatus including dot-matrix printers commonly comprise a single or multiple head dot-matrix printer contained in a housing having an opening allowing the insertion of a sheet of material such that it can be placed in proximity to the printer head which will then print any desired information on the sheet. Such printers are usually intended to print information on forms or slips of paper inserted into the printer housing. It is important for the paper sheets to be positioned correctly with respect to the printer head particularly in terms of the distance from the head. If the paper sheet was to be too close to the head of the printer the printed information may be illegible and if the paper sheet was too far away the individual pins of the dot matrix printer could penetrate its ribbon thus damaging it and/or break or otherwise damage the pins themselves. In order to ensure that the paper is correctly positioned with respect to the printer head it is usual to provide a bar or plate positioned beneath the printer head and over which the paper sheet must pass. The bar or plate is fixed at such a distance from the printer head that the paper is at the correct distance from the printer head for accurate printing.

A problem with this arrangement occurs when the paper sheet on which the printer is to print the information is a form or slip composed of several sheets of paper and which may also include one or more sheets of carbon paper. In such a case the paper when placed on the bar or plate provided would be either too close to the printer head to permit legible printing or could be too thick to be placed between the bar and the head. To overcome this problem it is common to arrange the bar or plate such that it can be raised or lowered with respect to the printer head by adjustment of fixing screws or other similar means. Precise adjustment of a printer having such a configuration can be difficult and once the bar or plate is set to print on a form having, say, three sheets it would have to be adjusted again to print on a single sheet. During all such adjustments of the bar or plate it will be appreciated that the machine is unusable and hence if many adjustments are required the overall printing rate will be reduced.

It is an object of the present invention therefore to provide document handling apparatus in which the gap between a printer head and the sheet on which the head is to print is constant irrespective of the overall thickness of the sheet.

With this object in view the present invention provides document handling apparatus comprising a document reception platen movable with respect to a printer head such that a document placed on the platen can be brought into register with the printer head, means attached to the reception platen operative to raise and lower the platen respectively towards and away from the printer head, spacing means disposed close to the printer head such as to contact one face of a document placed on the reception platen and prevent it being moved closer to the printer head, the relative position of the spacing means and the the printer head being such that a document in contact with the spacing means is at a distance from the printing head pre-determined so as to allow the printer head during its operation to contact the document's surface, the apparatus also including means operative to move a document onto the reception platen, sensor means to sense the presence of a document on the reception platen and further respective means operative to move a document off the reception platen.

Preferably the means attached to the reception platen include a solenoid having a movable core with one exposed end to which is attached a cam linkage pivotally connected to a cam lever which is in turn connected in an axially off-set manner to a substantially cylindrical cam, the cam being in contact with the reception platen's underside at one end of said platen, the other end of the platen being pivotally mounted so as to permit raising and lowering of the platen's free end by partial rotation of the cam.

The invention will be described further by way of example with reference to the accompanying drawings in which:

FIG. 4 is a simplified front elevation of the preferred embodiment; and

FIG. 5 is a side elevation generally corresponding FIG. 2 illustrating a second embodiment of the invention.

Figure 1:
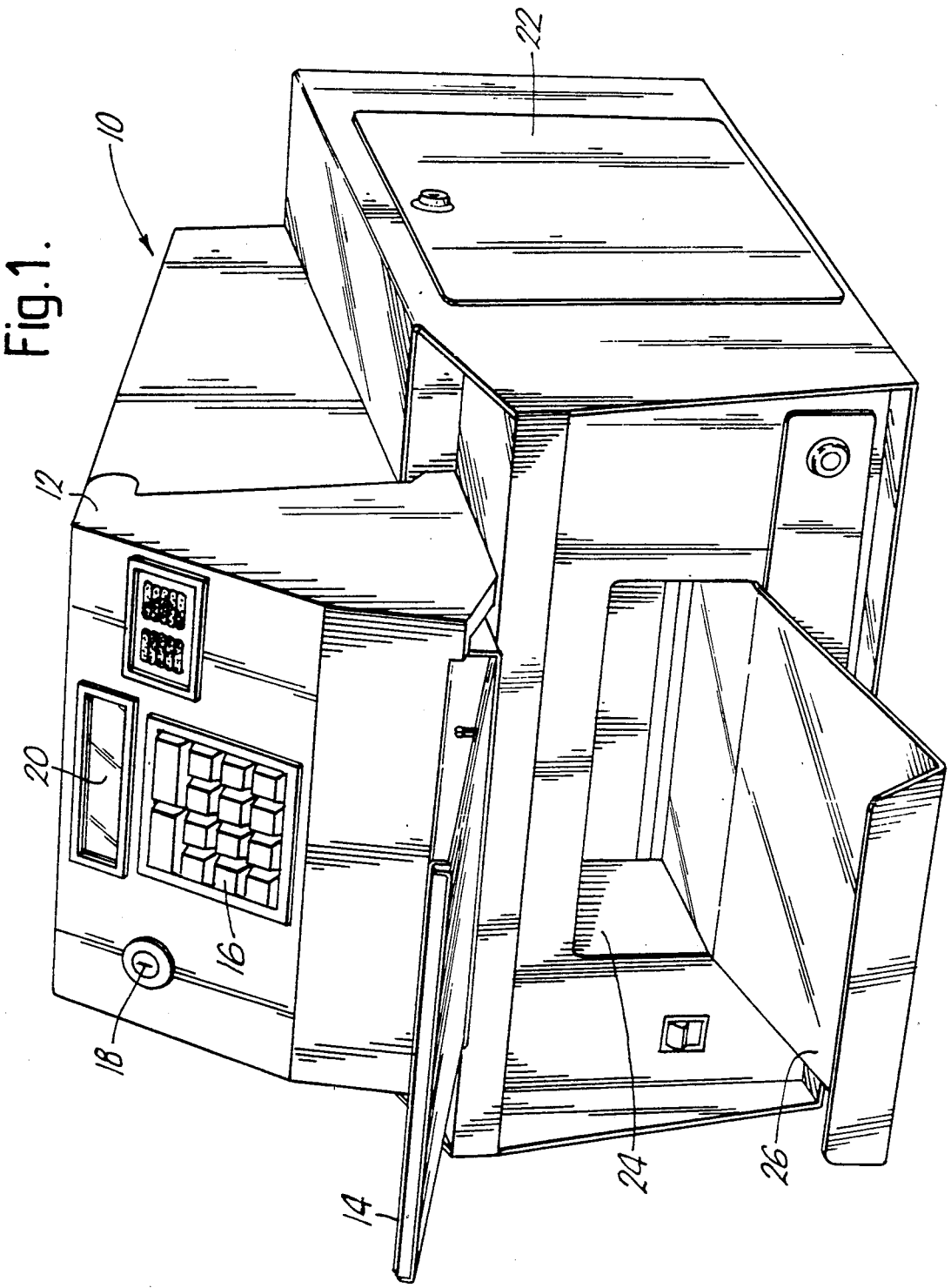
FIG. 1 is a perspective exterior view of a first preferred embodiment.

In FIG. 1 of the drawings a first preferred embodiment of document handling apparatus according to the invention is indicated generally by the reference numeral 10 and includes a housing 12 commonly of sheet metal or plastics. The housing includes a document reception chute 14, a numeric key pad 16, a key operated on/off switch 18 and a display panel 20 for example a liquid crystal display. A lockable side panel 22 permits access to the housing's interior to those persons in possession of a key to open said panel 22. The casing also includes a document exit port 24 and a returned document catch tray 26.

Figure 2:
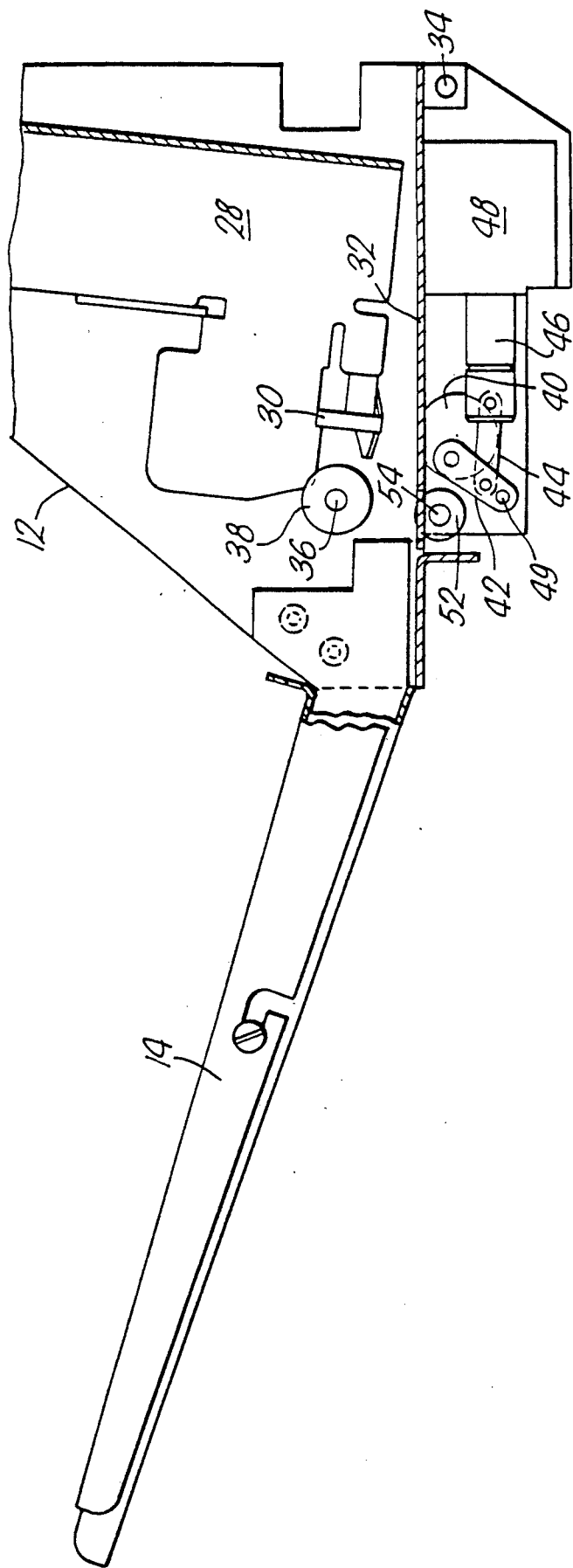
FIG. 2 is a simplified part sectional side elevation of the first preferred embodiment.
Figure 3:
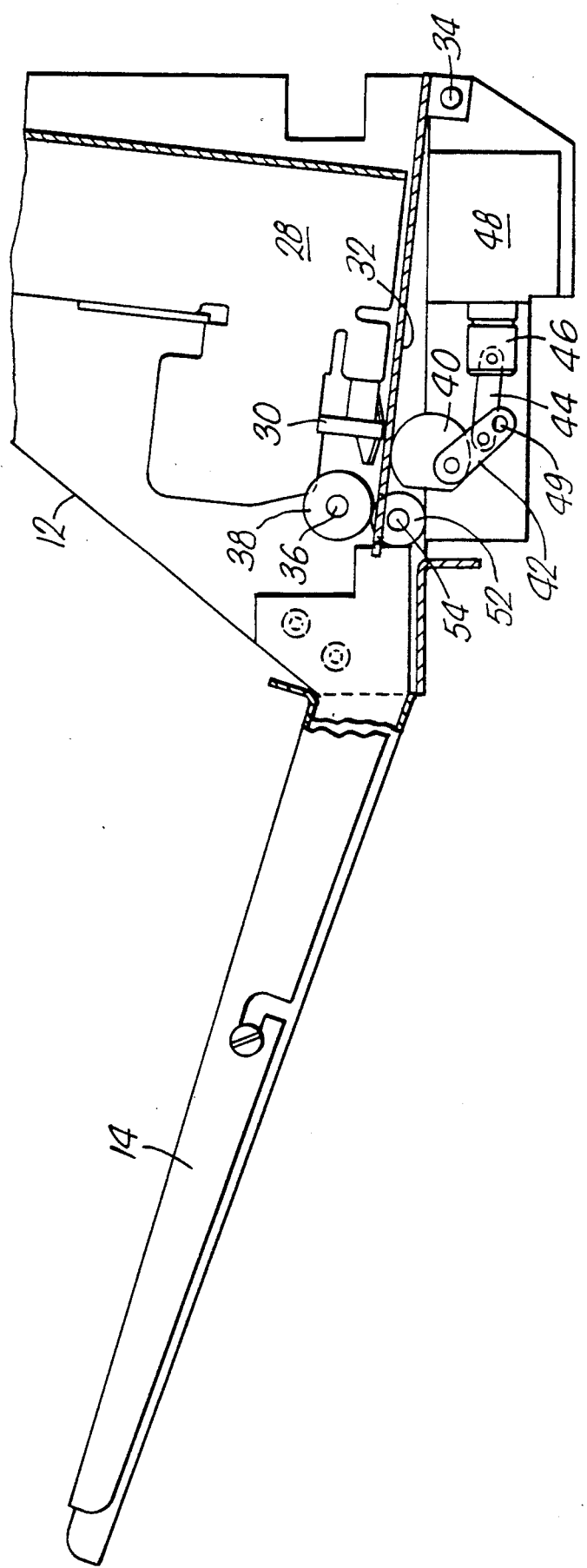
FIG. 3 is a view generally corresponding to FIG. 2 illustrating the platen in the raised position.

Turning now to FIGS. 2, 3 and 4 where the internal components of the apparatus 10 are illustrated it will be understood that the document reception chute 14 leads to a dot-matrix printer unit 28 including a printer head 30 disposed within the housing 12 at an angle to a horizontal surface. A movable reception platen 32 is provided below the printer head 30, to a spindle 34 disposed at one end remote from the printer head 30, so that the reception platen 32 is movable about the spindle 34. The movement of the platen 32 in an upward direction is limited by spacing means comprising a shaft 36 on which is mounted one or more cylindrical stoppers 38, 39 preferably of rubber. The shaft 36 is positioned such that when the platen 32 is raised so as to contact the stoppers 38, 39 the platen 32 is positioned substantially parallel to the printer unit 28 (See FIG. 4). The platen 32 is then disposed in relationship to the printer head 30 such that the distance between the platen 32 and the printer head 30 is substantially equal to the optimum distance for printing of letters or symbols by the printer head 30 onto a document (not shown) placed on the platen 32. This distance will depend on the precise type of printer head 30 being used.

The platen 32 is provided with two rollers 50, 52 rotatable about a shaft 54 which is attached to the platen's underside by two brackets 56, 58. Slots are provided in the platen 32 such that the rollers 50, 52 partially project therethrough and a portion of each roller stands proud of the platen's upper surface. Furthermore the rollers 50, 52 are each disposed such that when the platen 32 is in the raised position that the portion of each roller 50, 52 projecting through the platen 32 contacts the stoppers 38, 39 provided on the shaft 36. The rollers 50, 52 and stoppers 38, 39 thus co-operate to ensure correct positioning of the platen 32 with respect to the print head 30 whilst the rollers 50, 52 serve, when the platen 32 is lowered, to facilitate movement of a document (not shown) placed in the reception chute 14 over the platen 32.

The raising of the platen 32 to the printer head 30 is accomplished by a substantially cylindrical cam 40 eccentricallly mounted on cam lever 42 which is hingedly connected to a cam linkage 44. The cam linkage 44 is pivotally connected to a movable core 46 of a solenoid 48 provided with a return spring (not shown). A pin 49 provided on the cam lever 42 engages with the cam linkage 44 to limit the cylindrical cam's movement.

The housing 12 also includes other components which are conventional in appearance and are not illustrated for simplicity. These components include a plurality of driven conveyor rollers operative to grip and move a document from a lowered platen 32 into a document guide path which leads to a rotary microfilm camera. Further conveyor rollers or similar means return the document to a document exit port 24 and returned document catch tray 26. Sensor means are also included disposed over the platen 32 and operative to sense the presence of a document placed thereon.

In operation a document (not shown) which may consist of one or more sheets of paper or a similar material is placed in the reception chute 14 where it slides down towards the printer unit 28 under the influence of gravity. Drive rollers (not shown) or other similar means are disposed betweeen the reception chute 14 and the printer unit 28 and are operative to grip said document and feed it over the rollers 50, 52 and onto the platen 32. The presence of a document on the platen 32 is sensed by the sensor which generates a control signal for the solenoid 48. The control signal causes the energisation of the solenoid 48 and hence the displacement of the moveable core 46 against the action of the return spring causing the rotation of the cam 40 via the cam lever 42 and the cam linkage 44. The rotation of the cam 40 raises the reception platen 32 from its rest position until the document contacts the stoppers 38, 39 preventing the platen 32 from being raised further. The document is thus held firmly between the respective pairs of stoppers 38, 39 and rollers 50, 52. As there is very little force in the movement of the core 46 by the solenoid 48 there is minimal strain put on any part by the stopped platen 32.

When the document is correctly positioned below the printer head 30 a control signal is generated causing a command or information request to appear on the liquid crystal display 20. The operator then inputs the information which is to be printed onto the document using the numeric keypad 16. The information thus entered is first displayed on the liquid crystal display 20 for checking and is then printed by the printer head 30 onto the document's upper surface. If it is desired the printer 28 may be pre-programmed to print the inputted information in pre-determined positions on the document as well as additional information or data which has been pre-programmed into the printer 28. When this operation is complete the solenoid 48 is deactivated. The return spring causes the core 46 to return to its rest position rotating the cam 40 and lowering the platen 32 and releasing the document.

It will be appreciated that the printer head 30 will always be the same distance from the document regardless of the number of sheets of paper of which it is composed. Thus the information printed will always be legible and there will be little risk of damage to the printer head 30 due to incorrectly positioned paper.

Once the document has been released by the lowered platen 32 it is moved off the platen 32 by further rollers (not shown) and over the platen pivot spindle 34. The document is then fed to a microfilming unit (not shown) including for example a rotary mocrofilm camera. The document, including the information entered thereon by the printer, is photographically reproduced on microfilm which reproduction is then stored within the housing 12. The original document is then returned to the operator via the document exit port 24 and the returned document catch tray 26.

The microfilmed documents may be accessed by removing side panel 22 which require a corresponding key. A further key is then required to remove the microfilm from the microfilming unit. The use of such lockable panels ensures that the microfilmed documents are only available to authorised personnel. A further security measure is to restrict the use of the machine 10 by providing the key operated on/off switch thus making it impossible to operate without a corresponding key. It will also be appreciated that neither the printer 28 or the microfilming unit may be operated separately and that any document placed in the reception chute 14 whilst the machine 10 is in operation will be reproduced onto microfilm.

FIG. 5 illustrates a second embodiment of document handling apparatus according to the invention which is referred to generally by the reference numeral 60. Parts which are identical to those already described are referred to by the same reference numerals. As in the first embodiment a housing 12 is provided with a document chute 14 leading to a movable platen 32 located below a dot matrix printer 28 having a printer head 30. The housing 12 is also provided with a numeric keypad 16 and display 20. The platen 32 is raised and lowered with respect to the head 30 by a cam 40 eccentrically connected to a cam lever 42 hinged to a cam linkage 44. The cam linkage is attached to a movable core 46 of a solenoid 48 which is provided with a return spring (not shown). The platen 32 is pivotally journalled at one end thereof on a spindle 34.

Over the spindle 34 is located a respective platen roller 62 which is disposed to contact a document placed on the platen 32 in its lowered position. A document path 64 provided extending from the platen 32 over an optical reading device 66 and thence between a pair of rollers 68, 70 one upper roller 68 of which is freely rotatable and the lower roller 70 being provided with means to cause its rotation for example a mechanical linkage to a motor (not shown) or similar. The document path 64 extends to a document exit 72 disposed opposite to the chute 14. Disposed over the document path 64 is a paper dispensing spool 74 around which is wound a length of paper tape 76. This tape 76 is led from the spool 74 over a tape guide 78 and between a second pair of rollers 80, 82 operative, when rotated, to feed the tape 76 onto the platen 32.

In operation a document, for example a card is placed in the reception chute 14 and caused to move over the platen 32 by rollers 62 and thence onto the document path 64. The document is pre-provided with data which is capable of being read by the optical reader 66. The data thus read is compared with pre-programmed data and an 'accept' or 'reject' decision is made. Such a decision will be carried out by a suitably programmed microprocessor (not shown) which has full working control of all the elements of the document handling apparatus. If the decision is to 'reject' then the document is caused to move further along the document path 64 until it leaves the housing 12 via the document exit 72.

If the data provided on the documents causes an 'accept' decision the direction of movement of the document is reversed and it is fed back over the platen 32. When the document is positioned as desired underneath the printer 28 the printing head 30 is caused to print information on the document either as inputted by the keypad 16 or pre-programmed or a combination of these two.

In the preferred embodiment the printer 28 prints a bar code on the document as part of the printed information. This bar code identifies the specific document and can contain information relating to the data read by the optical reader 66.

It is intended with the preferred embodiment that the document should be resubmitted to the apparatus 60 after a period of time has elapsed. The document enters the document chute 14 and is placed on the reception platen which is raised to the printer 28. A bar code reader 86 which is located alongside the printer head 30 scans the printed bar code and compares the information with stored values. The results of this comparison causes further pre-programmed information to be printed onto the document which is then returned to the apparatus operator.

A further aspect of the apparatus 60 is that a bar code can be produced without requiring the insertion of a document into the housing. In the absence of a document on the optical reader 66 and in response to instructions inputted on the keypad 16 the paper spool 74 can be caused to dispense a length of paper 76 onto the platen 32. The bar code and any other desired information is then printed onto the paper by the printer 28 and the paper is then ejected from the housing 12, after severing means (not shown) cuts the length dispensed from the spool, via the document chute 14. The bar code thus produced may be read by the bar code reader 86 at a later date as with that printed on an original document.

Variations are possible within the scope of the invention. For example, the solenoid means could be replaced by other mechanisms, for example pneumatic or hydraulic systems. The linkages between the solenoid core and the platen could be reduced in number or added to according to physical constraints imposed and the space available. The number of the rollers operative to move the document through the system can be increased or reduced as necessary. In order that the pairs of rollers can accommodate and grip any thickness of document, the upper free roller is preferably moveable in a vertical direction with respect to the lower drive roller.

I claim:

1. Document handling apparatus characterized in that the apparatus comprises a reception platen moveable with respect to a printer head such that a document placed on said platen can be brought into register with said printer head, means attached to said reception platen operative to raise and lower said platen respectively towards and away from said printer head, spacing means disposed close to said printer head such as to contact one face of said document placed on said reception platen and prevent it being moved closer to said printer head, the relative position of the spacing means is at a distance from said printer head pre-determined so as to allow said printer head during its operation to contact said document's surface, said apparatus also including means operative to move said document onto said reception platen, sensor means to sense the presence of a document on said reception platen, means operative to move said document off said reception platen, said means attached to said reception platen including a solenoid having a moveable core with one exposed end to which is attached a cam linkage pivotally connected to a cam lever which is in turn connected in an axially offset manner to a substantially cylindrical cam, said cam being in contact with said reception platen's underside at one end of said platen, the other end of said platen being pivotally mounted so as to permit raising and lowering of said platen's free end by partial rotation of said cam, said sensor means being operative to control the raising and lowering of said platen with respect to said printer head, and said means operative to move said document off said reception platen are at least two rotatable rollers disposed in a vertically spaced relationship relative to one another, at least one of which rollers is connected to drive means to cause rotation thereof and to therefore move said document between said rollers, wherein an optical reader (66) is provided operative to read data pre-recorded on one face of a document, said data determining whether the document is to be presented to the printer head (30) for the printing of data thereon.

2. Document handling apparatus characterized in that the apparatus comprises a reception platen moveable with respect to a printer head such that a document placed on said platen can be brought into register with said printer head, means attached to said reception platen operative to raise and lower said platen respectively towards and away from said printer head, spacing means disposed close to said printer head such as to contact one face of said document placed on said reception platen and prevent it being moved closer to said printer head, the relative position of the spacing means is at a distance from said printer head pre-determined so as to allow said printer head during its operation to contact said document's surface, said apparatus also including means operative to move said document onto said reception platen, sensor means to sense the presence of a document on said reception platen, means operative to move said document off said reception platen, said means attached to said reception platen including a solenoid having a moveable core with one exposed end to which is attached a cam linkage pivotally connected to a cam lever which is in turn connected in an axially offset manner to a substantially cylindrical cam, said cam being in contact with said reception platen's underside at one end of said platen, the other end of said platen being pivotally mounted so as to permit raising and lowering of said platen's free end by partial rotation of said cam, said sensor means being operative to control the raising and lowering of said platen with respect to said printer head, and said means operative to move said document off said reception platen are at least two rotatable rollers disposed in a vertically spaced relationship relative to one another, at least one of which rollers is connected to drive means to cause rotation thereof and to therefore move said document between said rollers, and wherein an optical reader (66) is provided operative to read data prerecorded on one face of a document, said data determining whether the document is to be presented to the printer head (30) for the printing of data thereon, further including a dispensing spool (74), said spool having a length of paper tape (76) therearound and being provided with means (78, 80, 82) to dispense said paper tape (76) over the reception platen (32) and to present same to the printer head (30) for the printing of information thereon.

3. Document handling apparatus comprising a reception platen pivotally mounted at one end thereof so as to permit its raising and lowering with respect to a printer head such that a document placed on said platen can be brought into registery with said printer head comprising:

a solenoid having a moveable core and one exposed end, a cam linkage attached to said exposed end and pivotally connected to a cam lever, said cam lever connected in an axially offset manner to a cylindrical cam, said cam being arranged so as to be in contact with said reception platen's underside at one end of said platen and across substantially the entire width of said platen;

spacing means disposed close to said printer head so as to contact one face of a said document placed on said reception platen thereby to prevent further movement of said platen closer to said printer head, said spacing means being preset at a distance from said printer head such as to allow said printer head during its operation to contact the surface of said document;

means operative to move a document onto said reception platen;

sensor means operative to sense the presence of said document on said reception platen; and further respective means operative to move said document off said reception platen.

4. Document handling apparatus characterized in that the apparatus comprises a reception platen moveable with respect to a printer head such that a document placed on said platen can be brought into register with said printer head, means attached to said reception platen operative to raise and lower said platen respectively towards and away from said printer head, spacing means disposed close to said printer head such as to contact one face of said document placed on said reception platen and prevent it being moved closer to said printer head, the relative position of the spacing means is at a distance from said printer head pre-determined so as to allow said printer head during its operation to contact said document's surface, said apparatus also including means operative to move said document onto said reception platen, sensor means to sense the presence of a document on said reception platen, means operative to move said document off said reception platen, said means attached to said reception platen including a solenoid having a moveable core with one exposed end to which is attached a cam linkage pivotally connected to a cam lever which is in turn connected in an axially offset manner to a substantially cylindrical cam, said cam being in contact with said reception platen's underside at one end of said platen, the other end of said platen being pivotally mounted so as to permit raising and lowering of said platen's free end by partial rotation of said cam, said sensor means being operative to control the raising and lowering of said platen with respect to said printer head, and said means operative to move said document off said reception platen are at least two rotatable rollers disposed in a vertically spaced relationship relative to one another, at least one of which rollers is connected to drive means to cause rotation thereof and to therefore move said document between said rollers.

* * * * *